(12) United States Patent
Noboritate et al.

(10) Patent No.: US 10,442,347 B2
(45) Date of Patent: Oct. 15, 2019

(54) IN-VEHICLE ILLUMINATION SYSTEM

(71) Applicant: YAZAKI CORPORATION, Minatu-ku, Tokyo (JP)

(72) Inventors: Kazuma Noboritate, Makinohara (JP); Kazuya Sato, Makinohara (JP); Terumitsu Sugimoto, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/417,561

(22) Filed: Jan. 27, 2017

(65) Prior Publication Data

US 2017/0217364 A1    Aug. 3, 2017

(30) Foreign Application Priority Data

Jan. 29, 2016    (JP) .................................. 2016-016017

(51) Int. Cl.
*B60Q 3/217*    (2017.01)
*B60R 13/02*    (2006.01)
(Continued)

(52) U.S. Cl.
CPC ............. *B60Q 3/217* (2017.02); *B60Q 3/225* (2017.02); *B60Q 3/267* (2017.02); *B60Q 3/66* (2017.02);
(Continued)

(58) Field of Classification Search
CPC .... B60R 2013/0243; B60R 2013/0287; B60Q 3/217; B60Q 3/225; B60Q 3/233; B60Q 3/80; B60Q 3/267; B60Q 3/66; B60Q 3/64
(Continued)

(56) References Cited

U.S. PATENT DOCUMENTS 6,000,959 A * 12/1999 Curtindale .......... B60R 16/0207
                                                    439/246
6,160,475 A * 12/2000 Hornung ................ B60Q 3/217
                                                    307/10.8
(Continued)

FOREIGN PATENT DOCUMENTS

CN     101240880 A    8/2008
EP       1110822 A2 *  6/2001 ............. B60Q 1/323
(Continued)

OTHER PUBLICATIONS

Communication dated Jan. 23, 2018, from the Japanese Patent Office in counterpart application No. 2016-016017.
(Continued)

*Primary Examiner* — Sharon E Payne
(74) *Attorney, Agent, or Firm* — Sughrue Mion, PLLC

(57) ABSTRACT

An in-vehicle illumination system which is to be disposed in a door of a vehicle has: a door warning lamp which is disposed in the vicinity of a door handle that is operated when the door is to be opened, and which indicates an open/close state of the door; a door handle illumination lamp which illuminates the door handle; a decorative lamp which emits decorative light; and a first control connector having a first control apparatus which controls ON/OFF states of the door warning lamp, the door handle illumination lamp, and the decorative lamp. The first control apparatus of the first control connector causes, when the door is in an open state, the door warning lamp, the door handle illumination lamp, and the decorative lamp to be lighted ON with a predetermined warning color.

6 Claims, 9 Drawing Sheets

(51) Int. Cl.
  *B60Q 3/267* (2017.01)
  *B60Q 3/225* (2017.01)
  *B60Q 3/66* (2017.01)
  *B60R 7/04* (2006.01)
  *B60Q 3/80* (2017.01)
  *B60R 11/02* (2006.01)
  *B60R 11/00* (2006.01)
  *B60Q 3/64* (2017.01)

(52) U.S. Cl.
  CPC ............ *B60Q 3/80* (2017.02); *B60R 7/046* (2013.01); *B60R 13/0243* (2013.01); *B60Q 3/64* (2017.02); *B60R 11/0217* (2013.01); *B60R 2011/0021* (2013.01); *B60R 2013/0287* (2013.01)

(58) Field of Classification Search
  USPC ........................................................ 362/488
  See application file for complete search history.

(56) References Cited

U.S. PATENT DOCUMENTS 6,536,928 B1 *  3/2003  Hein .................. B60Q 1/323
                                                116/28.1
7,550,935 B2 *  6/2009  Lys ..................... A43B 1/0027
                                                315/292
2008/0191626 A1  8/2008  Salter et al.
2011/0170304 A1 *  7/2011  Fujita ................. G02B 6/0008
                                                362/501

FOREIGN PATENT DOCUMENTS

JP      0328944 U        3/1991
JP      9-86273 A        3/1997
JP      11105547 A       4/1999
JP      2001-113945 A    4/2001
JP      2003212038 A     7/2003
JP      2009-126193 A    6/2009
WO      WO 2009089109 A1 *  7/2009  ............. B60Q 3/66

OTHER PUBLICATIONS

Chinese Office Action dated Nov. 7, 2018 issued by the State Intellectual Property Office of P.R. China in Counterpart Chinese Application No. 201710061185.0.

Communication dated Jun. 3, 2019 issued by the State Intellectual Property Office of P.R. China in counterpart Chinese Application No. 201710061185.0

* cited by examiner

IN-VEHICLE ILLUMINATION SYSTEM

CROSS REFERENCE TO RELATED APPLICATIONS

This application is based on and claims priority from Japanese patent application No. 2016-016017 filed on Jan. 29, 2016, the entire contents of which are incorporated herein by reference.

BACKGROUND OF THE INVENTION

1. Technical Field

The present invention relates to an in-vehicle illumination system.

2. Background Art

An automobile includes an illumination system for illuminating the vehicle interior. Such an in-vehicle illumination system is sometimes disposed in an interior panel (door trim) of a door (see Patent Literatures JP-A-9-86273, JP-A-2001-113945, and JP-A-2009-126193). A warning indicator which warns that a door is in an open state is disposed in the periphery of meters of an instrument panel, and the driver can recognize that one of doors is in an open state.

SUMMARY

In order to enable an occupant of a vehicle to easily recognize that a door is in an open state, recently, a warning lamp which warns that the door is in an open state, and which is different from the above mentioned warning indicator disposed in the periphery of meters is disposed in the door. However, there is a demand that a warning against an open state of a door is more surely recognized.

The invention has been conducted in view of the above-described circumstances. It is an object of the invention to provide an in-vehicle illumination system which can illuminate a vehicle interior, and which enables an occupant to surely recognize an open state of a door.

In order to attain the object, the in-vehicle illumination system of the invention is characterized in (1) to (4) below.
(1) An in-vehicle illumination system which is to be disposed in a door of a vehicle, including:
  a door warning lamp which is disposed in a vicinity of a door handle that is operated when the door is to be opened, and which indicates an open/close state of the door;
  a door handle illumination lamp which illuminates the door handle;
  a decorative lamp which emits decorative light; and
  a first control apparatus which controls ON/OFF states of the door warning lamp, the door handle illumination lamp, and the decorative lamp, wherein
  the first control apparatus causing, when the door is in an open state, the door warning lamp, the door handle illumination lamp, and the decorative lamp to be lighted ON with a predetermined warning color.
(2) The in-vehicle illumination system according to above (1) wherein,
  when the door is closed, the first control apparatus causes the door warning lamp, the door handle illumination lamp, and the decorative lamp to be lighted ON with a color that is different from the warning color, or lighted OFF.
(3) The in-vehicle illumination system according to above (1) or (2) wherein
  the door includes:
  a foot illumination lamp which illuminates a bottom portion of a vehicle interior;
  a pocket illumination lamp which illuminates a door pocket disposed in the door;
  a storage section illumination lamp which illuminates a storage section disposed in the door; and
  a second control apparatus which controls ON/OFF states of the foot illumination lamp, the pocket illumination lamp, and the storage section illumination lamp, and
  the second control apparatus causes the foot illumination lamp, the pocket illumination lamp, and the storage section illumination lamp to be lighted ON or OFF, based on an operation performed by an occupant.
(4) The in-vehicle illumination system according to above (3) wherein
  the second control apparatus is connected to harnesses which lead from the foot illumination lamp, the pocket illumination lamp, and the storage section illumination lamp, and installed in the door while being integrally disposed together with the harnesses into a sound absorption member.

In the in-vehicle illumination system having the configuration of (1) above, when the door is in the open state, the door warning lamp, the door handle illumination lamp, and the decorative lamp are caused by the first control apparatus to be lighted ON with the predetermined warning color such as red. Usually, an occupant is warned of the open state of the door by lighting of a warning indicator in the vicinity of meters. Recently, a door warning lamp is sometimes disposed in the vicinity of the door handle. However, there is a possibility that these warning devices cannot sufficiently transmit the warning to an occupant.

According to the invention, when the door is in an open state, not only the door warning lamp, but also the door handle illumination lamp which is to illuminate the door handle, and the decorative lamp which is to emit the decorative light are lighted with the predetermined warning color. Therefore, the open state of the door can be surely transmitted to the occupant.

In the in-vehicle illumination system having the configuration of (2) above, when the door is closed, the door warning lamp, door handle illumination lamp, and decorative lamp which have been lighted ON with the warning color are lighted ON with a color that is different from the warning color, or lighted OFF. Therefore, the occupant of the vehicle can surely recognize that the door is closed.

In the in-vehicle illumination system having the configuration of (3) above, the occupant can cause the foot illumination lamp, the pocket illumination lamp, and the storage section illumination lamp to be lighted ON or OFF as required, which makes the convenience improved.

In the in-vehicle illumination system having the configuration of (4) above, the second control apparatus, and the harnesses which lead from the second control apparatus can be installed into the door by installing the sound absorption member into the door, and the workability of wiring to the door can be remarkably improved.

According to the invention, it is possible to provide an in-vehicle illumination system which can illuminate a vehicle interior, and which enables an occupant to surely recognize an open state of a door.

In the above, the invention has been briefly described. When a mode (hereinafter, referred to as "embodiment") for carrying out the invention which will be described below is read through with reference to the accompanying drawings, the detail of the invention will be further clarified.

DETAILED DESCRIPTION OF EMBODIMENTS

Hereinafter, a specific embodiment of the invention will be described with reference to the figures.

Figure 1:
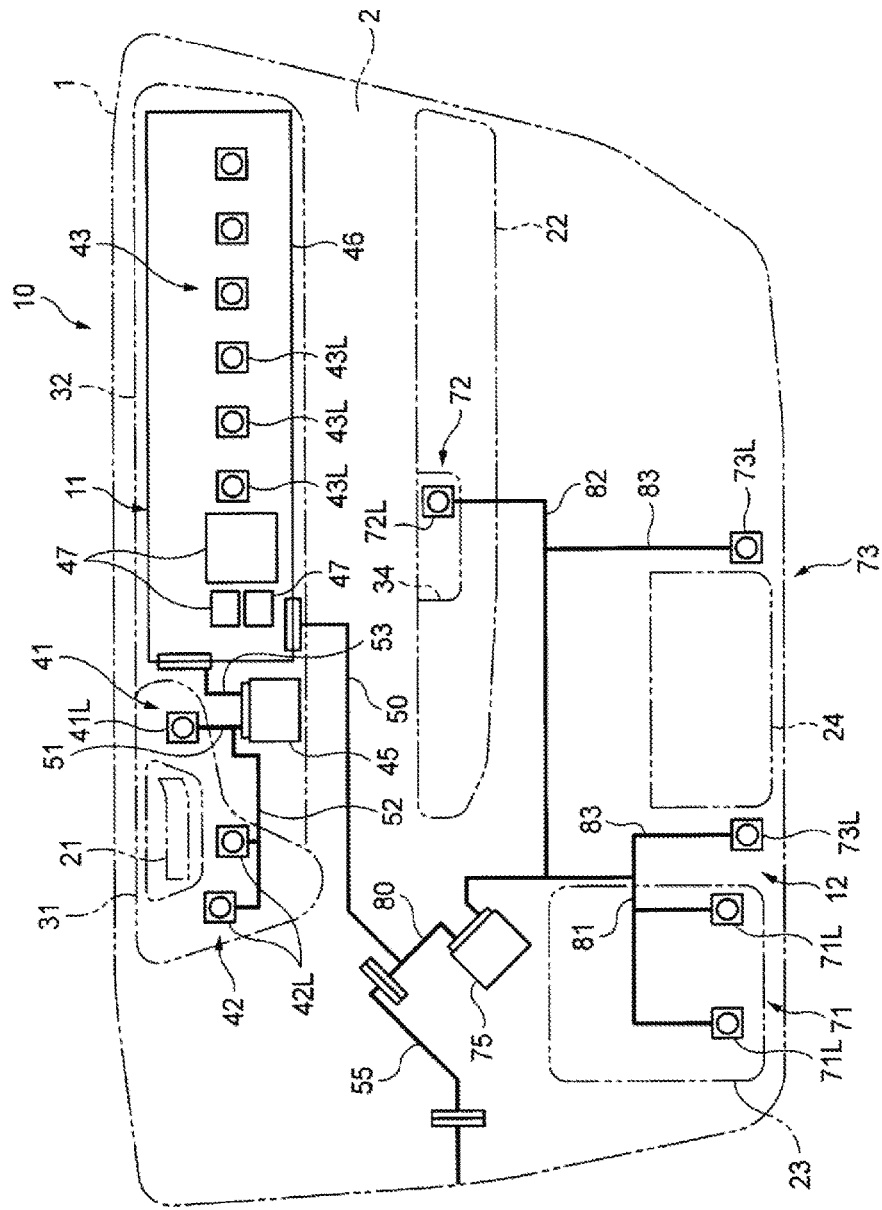
FIG. 1 is a diagram of a door illustrating an in-vehicle illumination system of the embodiment.
Figure 2:
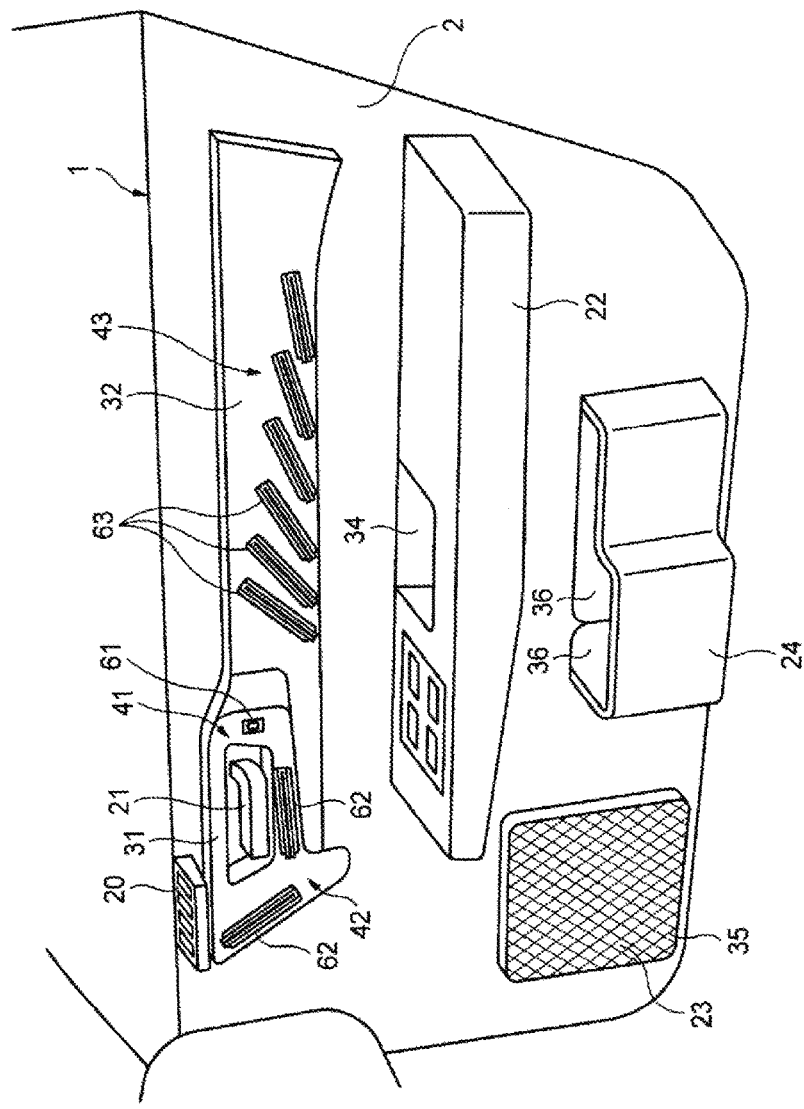
FIG. 2 is a schematic perspective view of the door in which the in-vehicle illumination system of the embodiment is disposed.

FIG. 1 is a diagram of a door illustrating an in-vehicle illumination system of the embodiment. FIG. 2 is a schematic perspective view of the door in which the in-vehicle illumination system of the embodiment is disposed.

As shown in FIGS. 1 and 2, the in-vehicle illumination system 10 of the embodiment is disposed in a door 1 of an automobile. The in-vehicle illumination system 10 has a first illumination unit 11 and a second illumination unit 12. The first and second illumination units 11, 12 are disposed in an interior panel 2 of the door 1. An illumination operating section 20 which is operated in setting or operation of the in-vehicle illumination system 10 is disposed in an upper portion of the interior panel 2 of the door 1.

A door handle 21, an arm rest 22, a speaker 23, and a storage section 24 are disposed in the door 1.

The door handle 21 is operated when the door 1 is to be opened. When the handle is pulled, the door 1 is opened. The door handle 21 is placed so as to be surrounded by a handle bezel 31 which is fixed to the interior panel 2. A decoration panel 32 which extends from the handle bezel 31 in the rear direction of the vehicle is disposed in the interior panel 2.

The arm rest 22 is fixed to the interior panel 2 in an approximate middle of the height direction of the door 1, and substantially horizontally placed. A door pocket 34 is disposed on the vehicle front side of the arm rest 22.

The speaker 23 is housed in the interior panel 2, and covered by a mesh-like speaker cover 35 which is disposed on the interior panel 2.

The storage section 24 is disposed in the lower portion of the interior panel 2. A drink holder 36 which expands toward the vehicle interior, and which has a columnar accommodation space that vertically extends is disposed in the storage section 24.

The first illumination unit 11 has a door warning lamp 41, a door handle illumination lamp 42, and a decorative lamp 43. The door warning lamp 41 and the door handle illumination lamp 42 are disposed in the handle bezel 31. The decorative lamp 43 is disposed in the decoration panel 32.

The first illumination unit 11 further has a light source 41L for the door warning lamp 41, two light sources 42L for the door handle illumination lamp 42, a plurality of light sources 43L for the decorative lamp 43, and a first control connector 45. All of the light sources 41L, 42L, 43L are configured by light emitting devices such as LEDs (Light Emitting Diodes), respectively. The light sources 41L, 42L are placed on the rear side of the handle bezel 31 which is opposite to the vehicle interior, and the light sources 43L are placed on the rear side of the decoration panel 32 which is opposite to the vehicle interior. The light sources 43L for the decorative lamp 43 are mounted on a board 46 in a row at intervals. Electronic components 47 such as a driver for driving the light sources 43L, a power supply circuit for supplying electric power to the driver, and a communication interface for communication between the driver and the first control connector 45 are mounted on the board 46. A harness 50 which is a bundle of wires is connected to the board 46. A harness 55 which leads from the instrument panel is connected to the harness 50.

The first control connector 45 is a connector including a first control apparatus. Harnesses 51, 52 leading from the light sources 41L, 42L, and a harness 53 leading from the board 46 on which the light sources 43L are mounted are connected via connectors to the first control connector 45. The first control apparatus of the first control connector 45 controls the emission colors and ON/OFF states of the light sources 41L, 42L, 43L. When the first control connector 45 is connected via connectors to the first illumination unit 11 as described above, the first illumination unit is configured as an illumination unit into which the first control apparatus that controls the ON/OFF states of the light sources 41L, 42L, 43L is incorporated.

A light guiding portion 61 that imitates a vehicle in which a door is opened is disposed in the handle bezel 31. The light source 41L for the door warning lamp 41 is placed on the rear side of the light guiding portion 61. Therefore, in the door warning lamp 41, when the light source 41L emits light, the light is guided as warning light through the light guiding portion 61 toward the vehicle interior.

Two slit-like light guiding portions 62 are further disposed in the handle bezel 31, and the light sources 42L for the door handle illumination lamp 42 are placed on the rear sides of the light guiding portions 62, respectively. Therefore, in the door handle illumination lamp 42, when the light sources 42L emit light, the light is guided as illumination light through the light guiding portions 62 toward the vehicle interior. The door handle 21 or the periphery thereof is illuminated by the light emitted from the light guiding portions 62.

Slit-like light guiding portions 63 which are equal in number to the light sources 43L for the decorative lamp 43 are disposed in the decoration panel 32, and the light sources 43L for the decorative lamp 43 are placed on the rear sides of the light guiding portions 63, respectively. Therefore, in the decorative lamp 43, when the light sources 43L emit light, the light is guided as decoration light through the light guiding portions 63 toward the vehicle interior. The light guiding portions 63 are placed so as to be more inclined to the vehicle rear side as further advancing from the vehicle front side toward the vehicle rear side.

Figure 3:
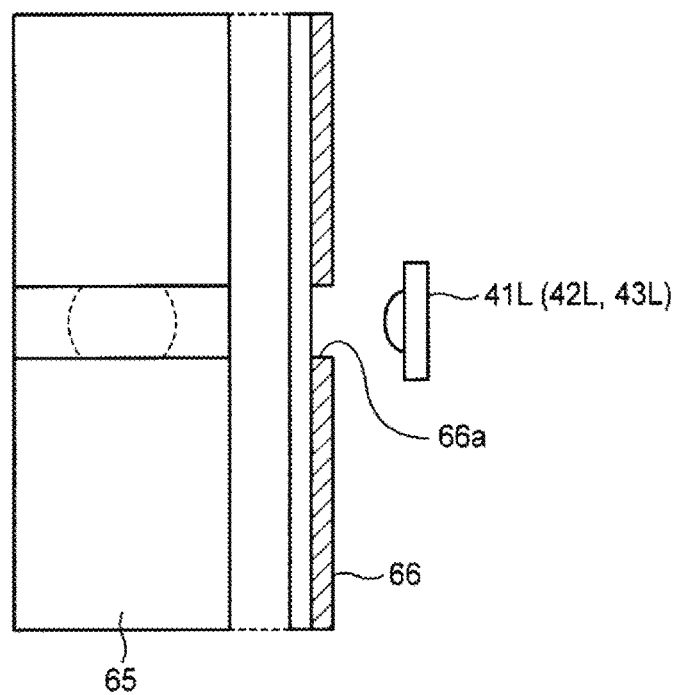
FIG. 3 is a schematic sectional view of a light guiding portion illustrating the structure of the light guiding portion.

FIG. 3 is a schematic sectional view of a light guiding portion illustrating the structure of the light guiding portion.

As shown in FIG. 3, each of the handle bezel 31 and the decoration panel 32 has a light guiding layer 65 configured by a resin material having the light guiding property, and a light blocking layer 66 which is applied to the rear side of the light guiding layer 65. Each of the light guiding portions 61, 62, 63 is configured by forming an opening 66a in the light blocking layer 66. In the light guiding portion 61, specifically, an opening 66a that imitates a vehicle in which a door is opened is formed in the light blocking layer 66, and, in each of the light guiding portions 62, 63, a slit-like opening 66a is formed in the light blocking layer 66. In each of the light guiding portions 61, 62, 63, the light which is emitted from the corresponding light source 41L, 42L, or 43L, and which passes through the opening 66a passes through the corresponding light guiding layer 65 to be guided to the vehicle interior.

The second illumination unit 12 has a foot illumination lamp 71, a pocket illumination lamp 72, and a storage section illumination lamp 73. The foot illumination lamp 71 is disposed in the speaker 23. The pocket illumination lamp 72 is disposed in the arm rest 22. The storage section illumination lamp 73 is disposed in the storage section 24.

The second illumination unit 12 further has light sources 71L for the foot illumination lamp 71, a light source 72L for the pocket illumination lamp 72, light sources 73L for the storage section illumination lamp 73, and a second control connector 75. All of the light sources 71L, 72L, 73L are configured by light emitting devices such as LEDs (Light Emitting Diodes), respectively. The light sources 71L are placed in the speaker 23. The light source 72L is placed in the door pocket 34 of the arm rest 22. The light sources 73L are placed in the storage section 24.

The second control connector 75 is a connector including a second control apparatus. Harnesses 81, 82, 83 leading from the light sources 71L, 72L, 73L are connected via connectors to the second control connector 75. The second control apparatus of the second control connector 75 controls the emission colors and ON/OFF states of the light sources 71L, 72L, 73L. A harness 80 is connected to the second control connector 75. The harness 55 which leads from the instrument panel is connected to the harness 80. When the second control connector 75 to the second illumination unit 12 is connected via connectors as described above, the second illumination unit is configured as an illumination unit into which the second control apparatus that controls the ON/OFF states of the light sources 71L, 72L, 73L is incorporated.

Figure 4:
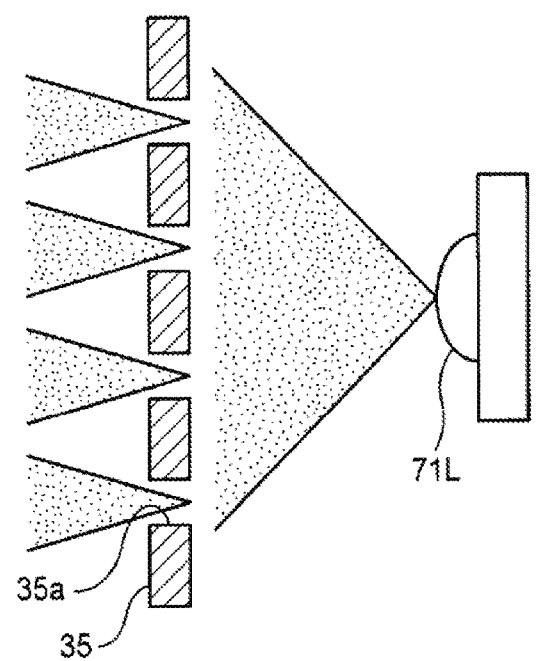
FIG. 4 is a sectional view of a speaker cover portion illustrating the structure of a foot illumination lamp.

FIG. 4 is a sectional view of a speaker cover portion illustrating the structure of the foot illumination lamp.

As shown in FIG. 4, the light sources 71L for the foot illumination lamp 71 are placed on the rear side of the speaker cover 35. The light sources 71L for the foot illumination lamp 71 are directed to the speaker cover 35. When the light sources 71L emit light, the light passes through gaps 35a of the mesh of the speaker cover 35 to be guided to the vehicle interior, and a lower portion of the vehicle interior is illuminated by the light.

Figure 5:
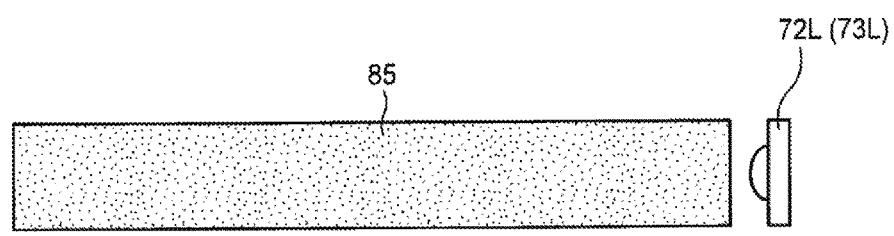
FIG. 5 is a schematic sectional view of a light guiding plate illustrating the structures of a pocket illumination lamp and a storage section illumination lamp.

FIG. 5 is a schematic sectional view of a light guiding plate illustrating the structures of the pocket illumination lamp and the storage section illumination lamp.

As shown in FIG. 5, light guiding plates 85 are placed in bottom portions of the door pocket 34 and the drink holder 36 of the storage section 24, respectively, and the light source 72L for the pocket illumination lamp 72 and the light sources 73L for the storage section illumination lamp 73 are placed with being directed toward end surfaces of the respective light guiding plates 85. In the pocket illumination lamp 72, the light guiding plate is caused to perform surface light emission by the light emitted from the light source 72L. In the door pocket 34, therefore, the interior is illuminated by the pocket illumination lamp 72 which performs surface light emission in the bottom portion of the pocket. In the storage section illumination lamp 73, similarly, the light guiding plate 85 is caused to perform surface light emission by the light emitted from the light sources 73L. In the drink holder 36 of the storage section 24, therefore, the interior is illuminated by the storage section illumination lamp 73 which performs surface light emission in the bottom portion of the holder.

Figure 6:
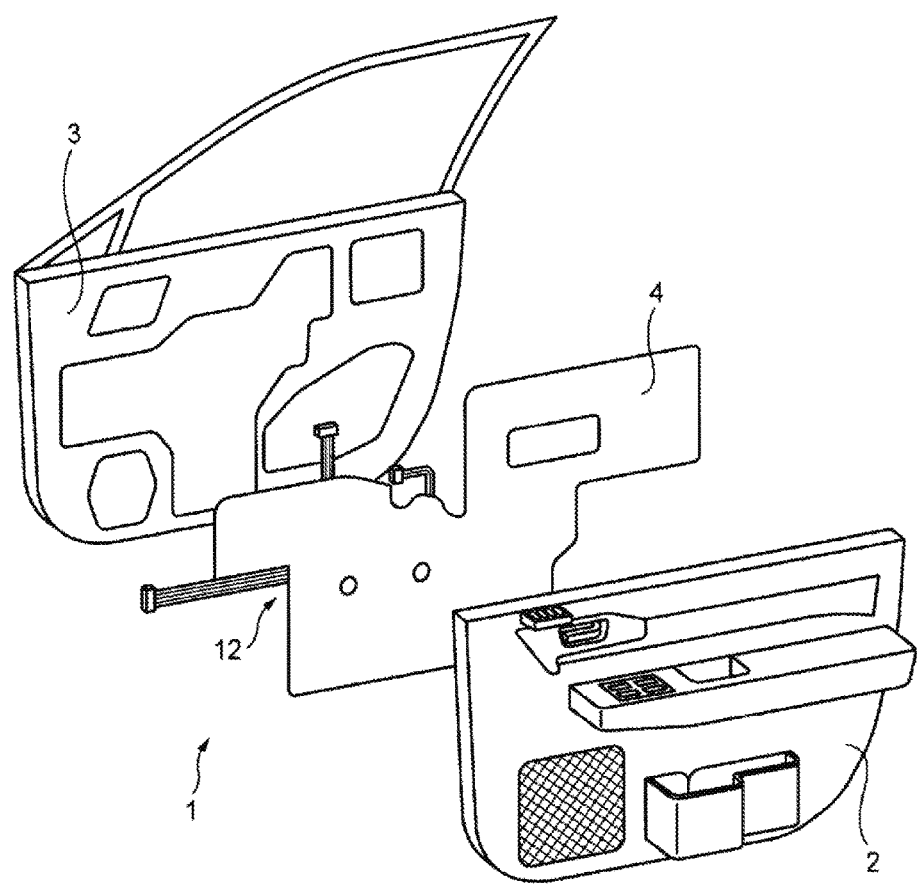
FIG. 6 is a schematic exploded perspective view illustrating the structure of the door.
Figure 7:
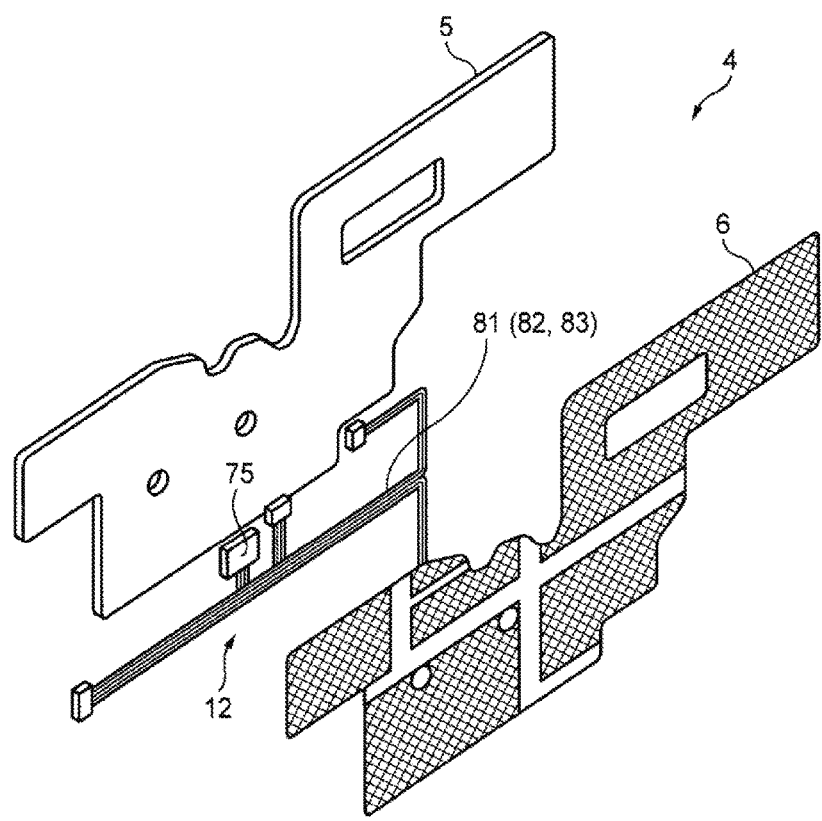
FIG. 7 is a schematic exploded perspective view of a sound absorption panel in which a second illumination unit is disposed.

FIG. 6 is a schematic exploded perspective view illustrating the structure of the door. FIG. 7 is a schematic exploded perspective view of a sound absorption panel in which the second illumination unit is disposed.

In the door 1, as shown in FIG. 6, a sound absorption panel (sound absorption member) 4 is disposed between an outer panel 3 and the interior panel 2. In the second illumination unit 12, the second control connector 75, and harnesses such as the harnesses 81, 82, 83 leading from the second control connector 75 are disposed integrally with the sound absorption panel 4. As shown in FIG. 7, the sound absorption panel 4 has a sound absorbing layer 5 in which a sound absorption member having the sound absorbing property and the heat insulating property is formed into a planar shape, and a holding plate 6 which is applied to the sound absorbing layer 5. The second illumination unit 12 is sandwiched between the sound absorbing layer 5 and the holding plate 6 to be integrated therewith. Therefore, the second illumination unit 12 is installed into the door 1 by fixing the sound absorption panel 4 to the interior panel 2 of the door 1, and then attaching the interior panel 2 to the outer panel 3.

Next, the illumination control performed by the thus configured in-vehicle illumination system 10 will be described.

First, the control of the illumination by the first illumination unit 11 will be described.

In the first illumination unit 11, the first control apparatus of the first control connector 45 controls the ON/OFF states and emission colors of the door warning lamp 41, the door handle illumination lamp 42, and the decorative lamp 43.

(When Door 1 is in Close State)

When the door 1 is in the close state, the door warning lamp 41 is maintained in the OFF state. Therefore, the occupant can visually recognize that the door 1 is in the close state.

When the door 1 is in the open state, the door handle illumination lamp 42 is lighted ON with the warning color, and, when the door is in the close state, lighted ON with a non-warning color. When the occupant stops the vehicle and then turns OFF the ignition switch, the light sources 42L for the door handle illumination lamp 42 emit white light to enter the ON state, and the door handle 21 is illuminated by the illumination light of the door handle illumination lamp 42. Even during the night or the like, therefore, the occupant can easily know the position of the door handle 21 which is illuminated by the door handle illumination lamp 42, and smoothly operate the door handle 21 to open the door 1.

In the decorative lamp 43, the plurality of light sources 43L are lighted ON/OFF one by one. During travel of the vehicle, for example, the plurality of light sources 43L are lighted ON in a sequence beginning with the light source on the vehicle front side. In the decorative lamp 43, therefore, a decorative effect is attained in which needle-shaped light in the light guiding portions 63 appears as if the light flows toward the vehicle rear side.

(When Door 1 is in Open State)

When the door 1 is opened to enter the open state, the first control apparatus of the first control connector 45 causes the all light sources 41L, 42L, 43L of the door warning lamp 41, the door handle illumination lamp 42, and the decorative lamp 43 to be simultaneously lighted ON with the predetermined warning color which is conspicuous, such as red or yellow. Accordingly, all of the door warning lamp 41, the door handle illumination lamp 42, and the decorative lamp 43 are simultaneously lighted ON with the warning color. When seeing the door warning lamp 41, door handle illumination lamp 42, or decorative lamp 43 which is lighted ON with the warning color, therefore, the occupant can recognize that the door 1 is being opened.

(When Door 1 is Closed)

When the door 1 is closed, the first control apparatus of the first control connector 45 causes the all light sources 41L, 42L, 43L of the door warning lamp 41, the door handle illumination lamp 42, and the decorative lamp 43 to be simultaneously lighted ON with the non-warning color which is different from the warning color. For example, the light sources 41L, 42L, 43L are caused to emit light of the predetermined non-warning color which produces a sense of safety, such as white or blue that is different from red and yellow. Therefore, all of the door warning lamp 41, the door handle illumination lamp 42, and the decorative lamp 43 are simultaneously lighted ON with the non-warning color. When seeing the door warning lamp 41, door handle illumination lamp 42, or decorative lamp 43 which is lighted ON with the non-warning color, the occupant can recognize that the door 1 is closed.

The lighting of the door warning lamp 41, the door handle illumination lamp 42, and the decorative lamp 43 with the non-warning color may be turned OFF after elapse of a time period of several seconds which is sufficient for the occupant to recognize that the door 1 is closed.

When the door 1 is closed, the lighting of the door warning lamp 41, the door handle illumination lamp 42, and the decorative lamp 43 with the warning color may be simultaneously turned OFF by the first control apparatus of the first control connector 45. According to the configuration, when seeing that the door warning lamp 41, door handle illumination lamp 42, and decorative lamp 43 which have been lighted ON with the warning color are simultaneously turned OFF, the occupant can recognize that the door 1 is closed.

Next, the control of the illumination by the second illumination unit will be described.

In the second illumination unit 12, based on instructions from the illumination operating section 20 which is operated by the occupant, the second control apparatus of the second control connector 75 controls the ON/OFF states and emission colors of the foot illumination lamp 71, the pocket illumination lamp 72, and the storage section illumination lamp 73. Namely, the occupant can operate the illumination operating section 20 as required so that the emission colors and ON/OFF states of the foot illumination lamp 71, the pocket illumination lamp 72, and the storage section illumination lamp 73 are independently set.

When the foot illumination lamp 71 is lighted ON, for example, it is possible to easily search an article which has dropped at the foot, or the occupant can smoothly get in or out of the vehicle. When the pocket illumination lamp 72 is lighted ON, moreover, it is possible to easily search a small article in the door pocket 34, and, in the case where the door pocket 34 is to be grasped in order to close the door 1, it is possible to easily recognize the door pocket 34. When the storage section illumination lamp 73 is lighted ON, furthermore, it is possible to easily know the place of the storage section 24, particularly that of the drink holder 36, and therefore it is possible to easily load or unload a drink container into or from the drink holder 36.

According to the in-vehicle illumination system 10 of the embodiment, when the door 1 is in the open state, as described above, the door warning lamp 41, the door handle illumination lamp 42, and the decorative lamp 43 are caused to be lighted ON with the predetermined warning color such as red or yellow by the first control apparatus of the first control connector 45. The second control apparatus of the second control connector 75 may cause the foot illumination lamp 71, the pocket illumination lamp 72, and the storage section illumination lamp 73 to be lighted with the warning color. According to the configuration, when the door 1 is in the open state, also the foot illumination lamp 71, the pocket illumination lamp 72, and the storage section illumination lamp 73 are lighted with the warning color in addition to the door warning lamp 41, the door handle illumination lamp 42, and the decorative lamp 43, and therefore the occupant is warned in a wider range of the vehicle interior.

Usually, the occupant is warned that the door 1 is in an open state, by lighting of a warning indicator in the periphery of meters. Recently, a door warning lamp is sometimes disposed in the vicinity of the door handle 21. However, there is a possibility that these warning devices cannot sufficiently transmit the warning to the occupant.

In the embodiment, when the door 1 is in the open state, by contrast, not only the door warning lamp 41, but also the door handle illumination lamp 42 which illuminates the door handle 21, and the decorative lamp 43 which emits the decorative light are lighted ON with the predetermined warning color. Therefore, the open state of the door 1 can be surely transmitted to the occupant.

When the door 1 is closed, the door warning lamp 41, door handle illumination lamp 42, and decorative lamp 43 which have been lighted ON with the warning color are lighted ON with a color that is different from the warning color, or lighted OFF. Therefore, the occupant of the vehicle can surely recognize that the door 1 is closed.

According to the in-vehicle illumination system 10 of the embodiment, the occupant can cause the foot illumination lamp 71, the pocket illumination lamp 72, and the storage section illumination lamp 73 to be lighted ON or OFF as required. Therefore, the convenience can be enhanced.

Moreover, the second control apparatus of the second control connector 75 is connected via connectors to the harnesses which lead from the foot illumination lamp 71, the pocket illumination lamp 72, and the storage section illumination lamp 73, and then installed in the door 1 while being integrally disposed together with the harnesses into the sound absorption panel 4. Therefore, the workability of wiring to the door 1 can be remarkably improved.

In the embodiment, the occupant can operate the illumination operating section 20 to set the in-vehicle illumination system 10 to any one of various lighting modes, and the first control apparatus of the first control connector 45 and the second control apparatus of the second control connector 75 cause the first illumination unit 11 and the second illumination unit 12 to be lighted ON in the set lighting mode. For example, the system may be set to a scenery mode in which the lighting color and the illuminance are selected and the units are lighted ON in accordance with the scenery outside the vehicle, an in-vehicle temperature mode in which the lighting color and the illuminance are selected and the units are lighted ON in accordance with the in-vehicle temperature, a vehicle speed mode in which the lighting color and the illuminance are selected and the units are lighted ON in accordance with the vehicle speed, an external-brightness mode in which the lighting color and the illuminance are selected and the units are lighted ON in accordance with the brightness of the outside of the vehicle, a drive mode in which the lighting color and the illuminance are selected and the units are lighted ON in accordance with the drive mode such as a sport mode, an ECO mode, or a normal mode, and the like.

Figure 8:
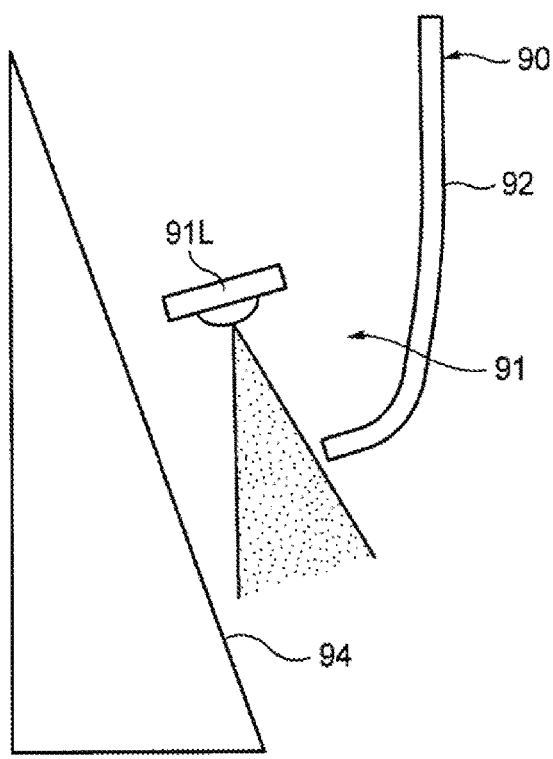
FIG. 8 is a schematic sectional view of a console section showing the foot illumination lamp which is disposed in a console box.
Figure 9:
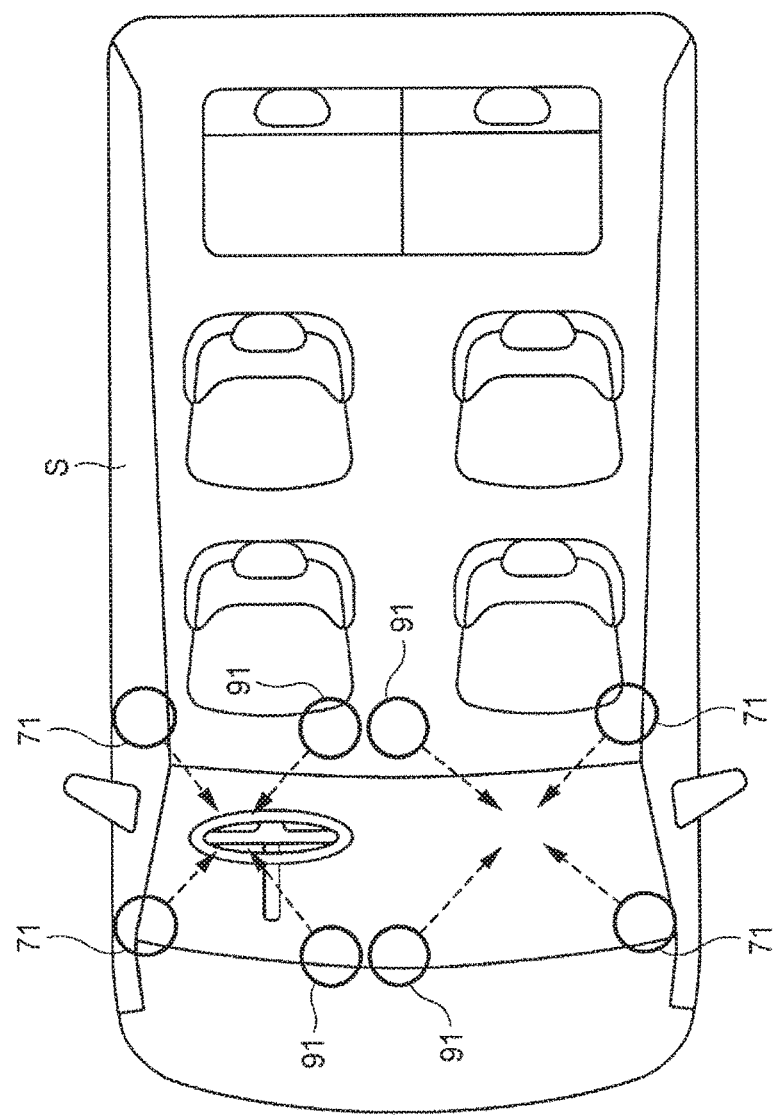
FIG. 9 is a diagram as viewing a vehicle including a plurality of foot illumination lamps from the upper side.

In the vehicle, as shown in FIG. 8, a foot illumination lamp 91 may be disposed in a center console 90. Specifically, a light source 91L is disposed on the rear side of a case 92 of the center console 90, and placed with being directed toward a gap between the case 92 and a mat 94 which is disposed in a bottom portion of the vehicle. According to the configuration, light of the light source 91L is guided to the bottom portion of the vehicle through the gap between the case 92 and the mat 94, and the feet of the occupant are illuminated.

When the foot illumination lamps 71, 91 are disposed in the door 1 and the center console 90 as described above, a wide range under the feet of the occupant of the vehicle S can be evenly illuminated in a plurality of directions (forward, rearward, rightward, and leftward), and it is possible to easily search an article which has dropped at the foot. Since the plurality of light sources are used in the lighting, the brightness of each of the light sources can be suppressed.

The invention is not limited to the above-described embodiment, and may be adequately subjected to modification, improvement, and the like. In addition, the materials, shapes, forms, dimensions, numbers, placement places, and the like of the components of the above-described embodiment are arbitrary and not limited insofar as the invention is achieved.

Here, features of the above-described embodiment of the in-vehicle illumination system of the invention are listed in [1] to [4] below in a brief and summarized manner.

[1] The in-vehicle illumination system (10) which is to be disposed in the door (1) of the vehicle, including:

the door warning lamp (41) which is disposed in the vicinity of the door handle (21) that is operated when the door (1) is to be opened, and which indicates the open/close state of the door (1);

the door handle illumination lamp (42) which illuminates the door handle (21);

the decorative lamp (43) which emits decorative light; and the first control apparatus (first control connector 45) which controls the ON/OFF states of the door warning lamp (41), the door handle illumination lamp (42), and the decorative lamp (43), wherein the first control apparatus (first control connector 45) causing, when the door (1) is in an open state, the door warning lamp (41), the door handle illumination lamp (42), and the decorative lamp (43) to be lighted ON with the predetermined warning color.

[2] The in-vehicle illumination system according to above [1] wherein, when the door (1) is closed, the first control apparatus (first control connector 45) causes the door warning lamp (41), the door handle illumination lamp (42), and the decorative lamp (43) to be lighted ON with a color that is different from the warning color, or lighted OFF.

[3] The in-vehicle illumination system according to above [1] wherein the door (1) includes:

the foot illumination lamp (71) which illuminates the bottom portion of the vehicle interior;

the pocket illumination lamp (72) which illuminates the door pocket (34) disposed in the door (1);

the storage section illumination lamp (73) which illuminates the storage section (24) disposed in the door (1); and the second control apparatus (second control connector 75) which controls the ON/OFF states of the foot illumination lamp (71), the pocket illumination lamp (72), and the storage section illumination lamp (73), and the second control apparatus (second control connector 75) causes the foot illumination lamp (71), the pocket illumination lamp (72), and the storage section illumination lamp (73) to be lighted ON or OFF, based on an operation performed by the occupant.

[4] The in-vehicle illumination system according to above [3] wherein the second control apparatus (second control connector 75) is connected to the harnesses (81, 82, 83) which lead from the foot illumination lamp (71), the pocket illumination lamp (72), and the storage section illumination lamp (73), and installed in the door (1) while being integrally disposed together with the harnesses (81, 82, 83) into the sound absorption member (sound absorption panel 4).

What is claimed is:

1. An in-vehicle illumination system which is to be disposed in a door of a vehicle, including:
    a door warning lamp which is disposed in a vicinity of a door handle that is operated when the door is to be opened, and which indicates an open/close state of the door;
    a door handle illumination lamp which illuminates the door handle;
    a decorative lamp which emits decorative light; and
    a first control apparatus which controls ON/OFF states of the door warning lamp, the door handle illumination lamp, and the decorative lamp,
    wherein in response to the door being closed while the door warning lamp, the door handle illumination lamp and the decorative lamp are ON and emitting a warning color, changing colors of the door warning lamp, the door handle illumination lamp and the decorative lamp from the warning color to a non-warning color,
    wherein the decorative lamp comprises a plurality of light emitting diodes (LEDs) arranged behind a panel of the door, and
    wherein the panel comprises a plurality of light guiding portions arranged at different angles from the door handle to a rear of the vehicle such that a first of the light guiding portions, closest to the door handle, is more closely perpendicular to a longitudinal axis of the door handle than is a second of the light guiding portions further from the door handle.

2. The in-vehicle illumination system according to claim 1, wherein
    the door includes:
        a foot illumination lamp which illuminates a bottom portion of a vehicle interior;
        a pocket illumination lamp which illuminates a door pocket disposed in the door;
        a storage section illumination lamp which illuminates a storage section disposed in the door; and
        a second control apparatus which controls ON/OFF states of the foot illumination lamp, the pocket illumination lamp, and the storage section illumination lamp, and
    the second control apparatus causes the foot illumination lamp, the pocket illumination lamp, and the storage section illumination lamp to be lighted ON or OFF, based on an operation performed by an occupant.

3. The in-vehicle illumination system according to claim 2, wherein
    the second control apparatus is connected to harnesses which lead from the foot illumination lamp, the pocket illumination lamp, and the storage section illumination lamp, and installed in the door while being integrally disposed together with the harnesses into a sound absorption member.

4. The in-vehicle illumination system according to claim 1,
wherein the decorative lamp comprises a plurality of LEDs arranged in a direction from the front of the vehicle to the back of the vehicle,
wherein the first control apparatus further, in response to an ignition of the vehicle being ON and the door being in a closed state, causes the decorative lamp to sequentially light the plurality of LEDs in the direction from the front of the vehicle to the back of the vehicle, and
wherein the first control apparatus further, in response to the ignition of the vehicle being ON and the door being in an open state, causes each of the plurality of LEDs to simultaneously display the warning color.

5. The in-vehicle illumination system according to claim 1,
wherein, in response to the door being opened while the door warning lamp, the door, handle illumination lamp and the decorative lamp are OFF, simultaneously turning ON the door warning lamp, the door, handle illumination lamp and the decorative lamp to the warning color, and
in response to the door being closed while the door warning lamp, the door handle illumination lamp and the decorative lamp are ON and emitting the warning color, changing colors of the door warning lamp, the door handle illumination lamp and the decorative lamp from the warning color to a non-warning color.

6. The in-vehicle illumination system according to claim 2, wherein the foot illumination lamp comprises a second plurality of light emitting diodes (LEDs) arranged behind a speaker cover of the vehicle, and
wherein the foot illumination lamp provides light through a mesh of the speaker cover.

* * * * *